United States Patent [19]
Dever et al.

[11] 3,725,510
[45] Apr. 3, 1973

[54] PHOSPHITE-PHOSPHATES

[75] Inventors: James L. Dever, Lewiston; James J. Hodan, Wiliamsville, both of N.Y.

[73] Assignee: Borg-Warner Corporation, Chicago, Ill.

[22] Filed: Feb. 5, 1970

[21] Appl. No.: 9,048

[52] U.S. Cl........260/927 R, 260/45.8 R, 260/465 R, 260/551 P, 260/930, 260/937, 260/958, 260/960, 260/967, 260/969
[51] Int. Cl......C07f 9/12, C07d 105/04, C08f 45/58
[58] Field of Search...........260/927 R, 930, 969, 953

[56] References Cited

UNITED STATES PATENTS 2,974,158 3/1961 Lanham.............................260/927 R
2,839,563 6/1958 Hechenbleikner...............260/930 X

OTHER PUBLICATIONS

Ramirez et al., J. Org. Chem. Vol. 22, (1957) pp. 856–858

*Primary Examiner*—Lewis Gotts
*Assistant Examiner*—Anton H. Sutto
*Attorney*—William S. McCurry and Roger A. Schmiege

[57] ABSTRACT

Trivalent phosphorus halides and tertiary phosphites react readily with a para-quinone to produce arylene phosphite-phosphate derivatives useful as flame retardants for organic materials.

9 Claims, No Drawings

PHOSPHITE-PHOSPHATES

BACKGROUND OF THE INVENTION

This invention relates to phosphite-phosphate esters of para-dihydroxy aromatic alcohols.

Trialkylphosphites have been reacted with chloranil to produce alkyl ethers of dialkyl para-hydroxy phenyl phosphates (Ramirez, et al., J.A.C.S., 81, 587 (1959).

Furthermore, it is known that trivalent phosphorus halides will react with aliphatic ketones in the presence of a tertiary phosphite to produce phosphinyl-phosphite derivatives (U.S. Pat. No. 3,014,945).

SUMMARY OF THE INVENTION

It has now been discovered that a trivalent phosphorus halide and a tertiary phosphite will react with a para-quinone to produce an arylene phosphite-phosphate in near quantitative yields.

DETAILED DESCRIPTION OF THE INVENTION

The process of this invention provides the reaction:

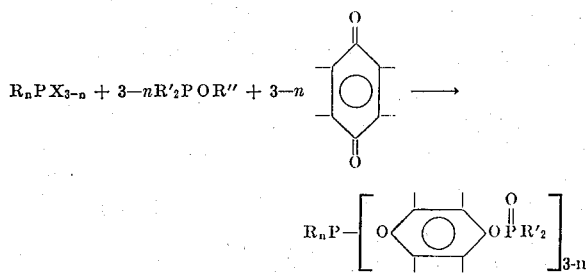

in which R is a member independently selected from the group consisting of lower alkyl, aryl of six to 10 carbon atoms, lower alkoxy, lower-dioxy-alkylene, ortho-dioxy-arylene of six to 10 carbon atoms, aryloxy of six to 10 carbon atoms, lower dialkylamino, diarylamino of 12 to 20 carbon atoms, lower alkylmercapto and arylmercapto of six to 10 carbon atoms, X is a member selected from the group consisting of - Cl and - Br, R' is a member selected from the group consisting of lower alkoxy, aryloxy of six to 10 carbon atoms, lower-dioxy-alkylene and ortho-dioxy-arylene of six to 10 carbon atoms, R'' is a member independently selected from the group consisting of lower alkyl and lower-haloalkyl, and $n$ is an integer from 0 to 2.

The para-quinone reactant employed in the process of this invention is any para-quinone compound with a reduction potential sufficiently high to cause it to react with a tertiary phosphite such as benzoquinone, 1,4-naphthoquinone, 1,4-anthraquinone and the like. Any para-quinone with non-meso keto groups will undergo the reaction. The quinoid reactant may be ring substituted by such groups as a lower alkyl, halo, cyano, and similar groups.

Examples of reactants of the formula $R_nPX_{3-n}$ which may be employed in the process of this invention are: $PCL_3$, $PBr_3$, dimethyl phosphorus chloride, dimethyl phosphorochloridite, methyl phosphoro-dichloridite, 2-chloroethyl phosphorodichloridite, phenyl phosphonous dichloride, diphenyl phosphonous chloride, phenyl phosphorodichloridite, diphenyl phosphorochloridite, hexyl phosphorodichloridite, dihexyl phosphorochloridite, 2-chloro-1,3,2-dioxa phospholane, 2-chloro-4,5-benzo-1,3,2-dioxa phospholane, 2-chloro-4,5-benzo-1-oxa-3-thia-2-phospholane, 2-chloro-4-chloromethyl-1,3,2-dioxaphospholane, 2-chloro-1,3,2-dioxaphosphorinane, 5,5-dimethyl-2-chloro-1,3,2-dioxa phosphorinane, 5-ethyl-5-butyl-2-chloro-1,3,2-dioxa phosphorinane, bis(N,N-dimethyl) phosphorodiamido chloridite, N,N-diethyl phosphoramido dichloridite, mercapto butyl phosphorodichloridite, and the like.

Examples of reactants of the formula $R'_2POR''$ which may be employed in the process of this invention are trivalent phosphorus esters having at least one alkoxy or haloalkoxy radical bonded to the trivalent phosphorus atom. The remaining valences of the trivalent phosphorus atom of the ester may be satisfied by the radicals defined by R'. An especially useful class of such trivalent phosphorus esters are the phosphite triesters having at least one alkoxy or haloalkoxy radical bonded to the trivalent phosphorus atom such as: trimethyl, triethyl, tris(2-chloroethyl), triisopropyl, tris(3,4-dichlorobutyl), tris(3-chloro-2-bromopropyl), tri-n-amyl, tri-n-hexyl, tris(2-ethylhexyl), trinonyl, tridodecyl, 3-bromopropyl diethyl, dimethyl ethyl, butyl diethyl, 6-iodohexyl dipropyl, amyl dioctyl, ethyl methyl propyl, butyl 2-iodoethyl phenyl, ethyl diphenyl, 2-bromopropyl bis(4-chlorophenyl), octyl bis(p-tolyl), undecyl bis(o-ethylphenyl), heptyl dibenzyl, dimethyl pentachlorophenyl, ethyl dinaphthyl, dibutyl phenyl, di-p-tolyl 2-fluoroethyl, tricyclohexyl, 2-chloro-ethyl dibiphenylyl, tris(4-methylcyclohexyl), and amyl cyclopentyl phenyl phosphites.

Likewise, compounds containing alkoxy or haloalkoxy radicals bonded to trivalent phosphorus may be employed. Examples of such compounds are : diethyl S-ethyl phosphorothioite, bis(2-chloroethyl) S-hexyl phosphorthioite, butyl 2-ethylhexyl S-propyl phosphorothioite, S-naphthyl naphthyl butyl phosphorothioite, S-(p-butylphenyl) 8-fluorododecyl ethyl phosphorothioite, and di-n-butyl S-cyclohexyl phosphorothioite. Other applicable reactants are ethyl phenyl phenylphosphonite, diethyl butylphosphonite, 2-chloroethyl 2-ethylhexyl β-naphthylphosphonite, 4-bromo-butyl S-methyl p-tolyl-phosphonothioite, 2-ethylhexyl S-cyclohexyl dodecylphosphonothioite, propyl S-dodecyl ethylphosphonothioite, 2,3-dichlorooctyl S(2-chloro-propyl) phenylphosphonothioite butyl 4-bromohexyl α-naphthylphosphonite cyclopentyl S-(4-amylphenyl) ethyl-phosphonothioite, 4-chlorocyclohexyl S-biphenylyl phenylphosphonothioite, methyl dimethylphosphinite, 2-chlorohexyl didodecylphosphinite, butyl diphenylphosphinite, ethyl (ethyl)-naphthylphosphinite, cyclohexyl diphenylphosphinite, octyl dibiphenylylphosphinite, 2-bromopropyl dipropylphosphinite and the like.

The process of this invention is performed by providing a substantially equimolar mixture of a trivalent phosphorus halide and the tertiary phosphite in an inert solvent as toluene or dioxane, followed by the addition of the para-quinone reactant. An exothermix reaction ensues. The reaction temperature is maintained from about 0° to 70° C and preferably from about 25° to about 45° C by conventional means such as the application of external cooling until the reaction subsides, at which time the temperature of the reaction mixture is raised to from about 70° to 95° C for a period of from 1 to 4 hours to insure completion of the reaction. The solvent may then be removed by distillation to afford the desired product. In many instances, a solid and/or crystalline product will precipitate from the solvent upon cooling of the reaction mixture. Conventional crystallization techniques may be applied to afford essentially quantitative yields of the desired arylene phosphite-phosphate derivatives of high purity.

The novel compounds of this invention are characterized by the general formula:

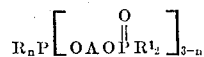

in which R is a member independently selected from the group consisting of lower alkyl, aryl of six to 10 carbon atoms, lower alkoxy, lower-dioxy-alkylene, ortho-dioxy-arylene of six to 10 carbon atoms, aryloxy of six to 10 carbon atoms, lower dialkylamino, diarylamino of 12 to 20 carbon atoms, lower alkylmercapto and arylmercapto of six to 10 carbon atoms, A is an aromatic moiety of from six to 14 carbon atoms in which the ring substituents are independently selected from the group consisting of -H, lower alkyl, -Cl, -Br and -CN, R' is a member selected from the group consisting of lower alkoxy, aryloxy of six to 10 carbon atoms, lower-dioxy-alkylene and ortho-dioxy-arylene of six to 10 carbon atoms, and n is an integer of from 0 to 2.

A preferred group of compounds are represented by the structural formula:

in which R and R' are members independently selected from the group consisting of lower alkoxy, lower-dioxy-alkylene and ortho-dioxy-arylene of six to 10 carbon atoms.

The compounds of the instant invention are especially useful as flame retardants for the use in conjunction with ordinarily flammable organic materials such as polyvinyl chloride.

The following examples illustrate both the process of the instant invention as well as representative compound products. These examples are presented by way of exemplification rather than limitation on the scope of the instant invention.

EXAMPLE I

In a 500 milliliter reaction flask was placed 125 milliliters of toluene, 56.2 grams (0.33 mole) of 5,5-dimethyl-2-chloro-1,3,2-dioxaphosphorinane and 49.6 grams (0.4 mole) of trimethyl phosphite. Then, 36.0 grams (0.33 mole) of freshly recrystallized para-benzoquinone was added in portions over a ten minute period. The temperature of the reaction was maintained below 35° C until the exothermic reaction subsided, at which time, the mixture was heated between 70° to 75° C for one hour.

The product was filtered and the solvent was removed by vacuum distillation to a final temperature of 60° C and pressure less than 1.0 millimeter mercury. The residual oil was suspended in 150 milliliters of petroleum ether and on cooling it solidified. The solid material was crushed and the petty ether removed by filtration. The product was dried to give a quantitative yield of white solid product having a melting point from 45.5° to 48.5° C. The product was recrystallized from a petroleum ether-diethyl ether solvent mixture to yield a pure white product having a melting point of 50° to 51.5° C.

Elemental Analysis
Calculated for $C_{13}H_{20}O_7P_2$ — C:44.5; H:5.75; P:17.70
Found — C:44.29; H:5.82; P:17.43
The product was

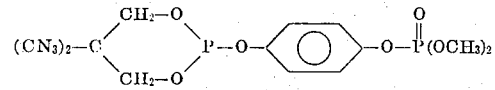

EXAMPLE II

The procedure of Example I was repeated with the exception that for the trivalent phosphorus halide there was substituted 2-chloro-1,3,2-dioxaphospholane. The product obtained in 98.4 percent conversion was

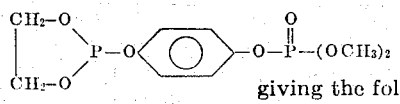

giving the following:

Elemental Analysis
Calculated for $C_{10}H_{14}O_7P_2$ — P:20.22
Found — P:19.63

EXAMPLE III

A 500 milliliter flask was charged with 38.0 grams (0.3 mole) of 2-chloro-1,3,2-dioxaphospholane and 69.0 grams (0.3 mole) of 5,5-dimethyl-2(2'-chloropropyl)-1,3,2-dioxaphosphorinane in 150 milliliters of toluene. The 32.4 grams (0.3 mole) of para-benzoquinone was added portionwise over a period of 0.6 hour while cooling the reaction mixture to keep the temperature below 30°C. The reaction was quite vigorous. Upon stirring the reaction mixture with ice bath cooling, a thick precipitate formed. The mixture was heated at 70° to 75° C. for one hour after the reaction subsided. The solvent was removed at a final temperature of 70°C. and less than 1.0 millimeter mercury absolute for 0.5 hour. THe residue was a hard white solid obtained in essentially a quantitative yield having the formula:

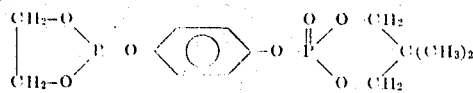

EXAMPLE IV

Following the procedure set forth in Example I, with the exception that the trivalent phosphorus halide was phosphorus trichloride and three moles each of para-quinone and trimethyl phosphite were employed, the product

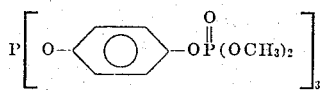

was obtained in 96 percent conversion and giving the following:
Elemental Analysis
Calculated for $C_{24}H_{30}O_{15}P_4$ — P:18.17; Cl:0.00
Found — P:17.85; Cl:nil.

EXAMPLE V

Following the procedure presented in Example I with the exception that for the trivalent phosphorus halide there was substituted 5,5-dimethyl-2-chloro-1,3,2-dioxaphosphorinane and for the tertiary phosphite there was employed 2-(2'-chloropropoxy)-5,5-dimethyl-1,3,2-dioxaphosphorinane, there was produced in quantitative yield the product

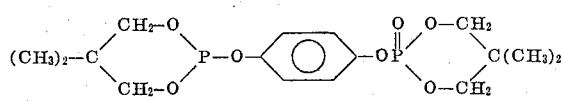

having a melting point of 201.5°–204.5°C. and
Elemental Analysis
Calculated for $C_{16}H_{24}O_7P_2$ — C:49.24; H:6.17; P:15.90
Found — C:49.33; H:6.28; P:15.65

EXAMPLE VI

A 500 milliliter flask was charged with 49.6 grams (0.4 mole) of trimethyl phosphite, 56.2 grams (0.33 mole) of 5,5-dimethyl-2-chloro-1,3,2-dioxaphosphorinane and 250 milliliters of toluene. To the flask contents was added 52.7 grams (0.33 mole) of 1,4-naphthoquinone portionwise over a half hour period with no apparent reaction. After stirring at room temperature for one half hour, heating was initiated. The mixture was warmed to 65°C. and the heat source removed. The reaction mixture maintained itself at this temperature for 20 minutes, after which period external heating was supplied for 3 hours to maintain the reaction mixture at a temperature between 70°–75°C. After this period of time, the solvent was removed at reduced pressure and the non-crystalline product was concentrated at 95°C. under 2.0 millimeters mercury pressure. An amber, viscous product weighing 135.1 grams was recovered.
Elemental Analysis
Calculated — P:15.44 percent
Found — P:14.9 percent
Total Cl — 0.2 percent
The product was:

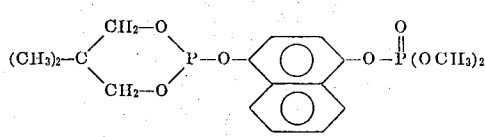

EXAMPLE VII

A 250 milliliter flask was charged with 33.7 grams (0.2 mole) of 5,5-dimethyl-2-chloro-1,3,2-dioxaphosphorinane and 48.3 grams (0.2 mole) of 5,5-dimethyl-2-(2'-chloropropoxy) - 1,3,2-dioxaphosphorinane in 75 milliliters of toluene. Then 35.4 grams (0.2 mole) of 2,5-dichloro-p-benzoquinone was added in portions over a 0.2 hour period at a temperature of 25°–35°C. After stirring the reaction mixture for 15 minutes, it became very thick as product precipitated. Another 100 milliliters of toluene was added. The exothermic reaction continued for 0.75 hour and the reaction mixture was then heated at 75°C for 1.5 hours. After cooling, the mixture was filtered and vacuum dried to yield 51 grams of white precipitate. The solvent was stripped from the filtrate to give 40.5 grams of a dark oily residue which slowly solidified. Recrystallization of the solidified material yielded an additional 32 grams of the desired product. The total conversion was 90 percent. The product, when recrystallized from a cyclohexane-benzene solvent gave a pure product having a melting point of 159.5°–161°C. of the formula

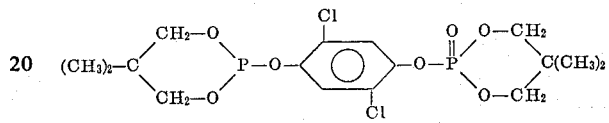

Elemental Analysis $C_{16}H_{22}Cl_2O_7P_2$
Calculated — C:42.41; H:4.77; Cl:15.30; P:13.38
Found — C:42.30; H:4.90; Cl:15.25; P:13.42

EXAMPLE VIII

A 250 milliliter flask was charged with 8.4 grams (0.05 mole) of 5,5-dimethyl-2-chloro-1,3,2-dioxaphosphorinane, 11.3 grams (0.05 mole) of 5,5-dimethyl-2(2'-chloropropoxy)-1,3,2-dioxaphosphorinane and 100 milliliters of toluene. Then 11.3 grams (0.05 mole) of 2,3-dichloro-5,6-dicyano-1,4-benzoquinone was added portionwise in ten minutes at a temperature of 20° to 30°C. After the exothermic reaction subsided, the mixture was heated three hours at a temperature of 90° to 100° C. After cooling, the mixture was filtered to yield 15.6 grams of an off-white solid. The solvent was stripped from the filtrate to afford an additional 9.6 grams of product. The product may be further purified by boiling in benzene and filtering to give a nearly white solid which decomposed at 247°–250° C. The product has the structural formula:

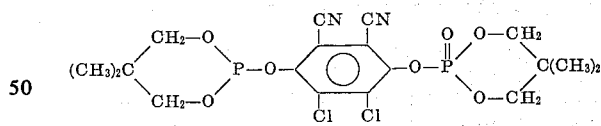

Elemental Analysis $C_{18}H_{20}Cl_2N_2O_7P_2$
Calculated — C:42.49; H:3.95; Cl:13.91; N:5.50; P:12.18
Found — C:42.40; H:4.03; Cl:13.95; N:5.40; P:12.16

EXAMPLE IX

A 250 milliliter flask was charged with 25.3 grams (0.15 mole) of 5,5-dimethyl-2-chloro-1,3,2-dioxaphosphorinane and 34.0 grams (0.15 mole) of 5,5-dimethyl-2-(2'-chloropropoxy)-1,3,2-dioxaphosphorinane in 125 milliliters of dioxane. Then 20.4 grams (0.15 mole) of 2,5-dimethyl-1,4-benzoquinone was added over a period of 10 minutes with no indication of reaction. After stirring at room temperature for 15 minutes, the mixture was heated at reflux (97° to 100° C) for four hours. A clear orange solution resulted, which upon cooling afforded a white crystalline solid. The crystalline material was recovered by filtration and the solvent was stripped from the filtrate to yield a combined product weighing 50.3 grams (80 percent conversion). The product was recrystallized from a mixed benzene-cyclohexane solvent to give a white crystalline product having a melting point of 166° to 168° C. The structural formula of the produce was:

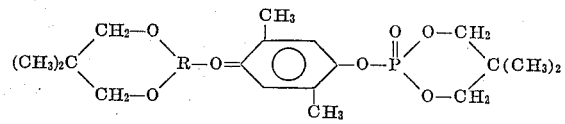

Elemental Analysis $C_{18}H_{28}O_7P_2$
Calculated — C:51.62; H:6.75; P:14.83
Found — C:51.74; H:6.84; P:14.64

EXAMPLE X

A 500 milliliter flask was charged with 43.7 grams (0.25 mole) of 4,5-benzo-2-chloro-1,3,2-dioxaphospholane, 56.7 grams (0.25 mole) of 5,5-dimethyl-2-(2'-chloropropoxy) - 1,3,2-dioxaphosphorinane and 100 milliliters of toluene. Then 27.0 grams (0.25 mole) of para-benzoquinone was added portionwise over a 0.2 hour period while maintaining the temperature of the reaction mixture below 33° C by means of cooling. After stirring for 0.25 hour the mixture was heated at about 70° C for one hour. The reaction mixture was stripped of solvent at 60° C and 25 millimeters mercury to afford an essentially quantitative yield of a pasty off-white solid. The product was recrystallized from a mixed diethyl ether-methylene chloride solvent to yield white crystals melting at 178°–179° C having the structural formula:

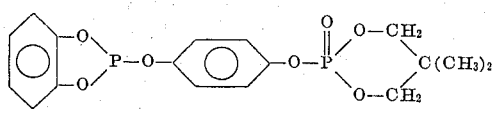

EXAMPLE XI

A 500 milliliter flask was charged with 42.2 grams (0.25 mole) of 5,5-dimethyl-2-chloro-1,3,2-dioxaphosphorinane, 56.7 grams (0.25 mole) of 5,5-dimethyl-2-(2'-chloropropoxy)-1,3,2-dioxaphosphorinane and 150 milliliters of toluene. The 61.5 grams (0.25 mole) of chloranil was added portionwise to the reaction mixture. After the exothermic reactions subsided, the temperature was increased to 75° C for a period of two hours. The reaction mixture was then cooled to room temperature, filtered and the solid product was washed with toluene and dried in a flask evaporator to yield 112.8 grams of white crystalline material having the structural formula:

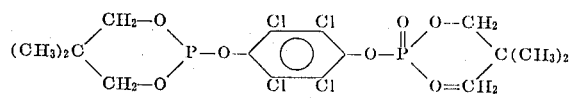

The filtrate was evaporated to yield an additional 21.3 grams of product.

EXAMPLE XII

Dry blends of the following composition were prepared 100.0 parts, 30.8 grams — polyvinyl chloride powder
60.0 parts, 18.5 grams — dioctylphthalate
2.0 parts, 0.63 grams — barium cadmium laurate stabilizer
8.5 parts, 2.63 grams of the flame retardants of this invention identified as: I, II, III and IV. The blended material was milled on a two roll mill at 150° to 155°C. until completely mixed. The mixture was removed at a thickness of about 20 to 25 mils.

Approximately 5 gram sections were removed from the prepared stock and pressed into films 7–14 mils thick for flammability testing. The films were prepared in a hydraulic press between photographic plates at 150°C. under an applied pressure of 30,000 pounds per square inch gauge reached during the first 30 seconds and held for 2 minutes. The plates were then quickly removed from the press and quenched in cold water. Two by 6 inch specimens were cut from the films for testing in accordance with ASTM–D1433–58.

The compounds tested, the appearance of the films and the self-extinguishing time as an average of six tests for each compound tested are as follows:

I.

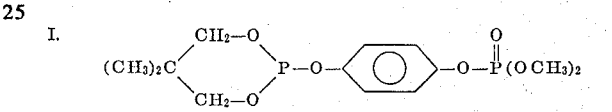

Almost clear, colorless—20.5 seconds

II.

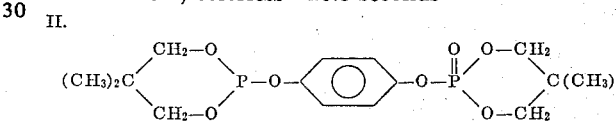

Clear, severe blooming, colorless—3.7 seconds

III.

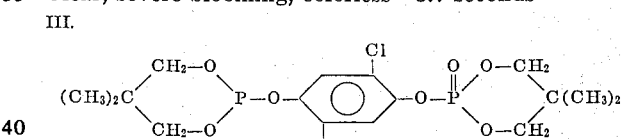

Almost clear, blooming, colorless—3.5 seconds

IV

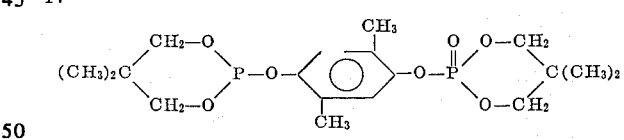

Almost clear, colorless—4.3 seconds

V. Control - Clear, colorless - non-self extinguishing - burns until consumed.

What is claimed is:

1. A compound of the formula

in which R is a member independently selected from the group consisting of lower alkyl, aryl of six to 10 carbon atoms, lower alkoxy, lower-dioxy-alkylene, ortho-dioxy-arylene of six to 10 carbon atoms, aryloxy of 6 to 10 carbon atoms, lower dialkylamino, diarylamino of 12 to 20 carbon atoms, lower alkylmercapto and arylmercapto of six to 10 carbon atoms, A is an aromatic moiety of from six to 14 carbon atoms in which the ring substituents are independently selected from the group consisting of -H, lower alkyl, -Cl, -Br and -CN, R' is a member selected from the group consisting of lower alkoxy, aryloxy of six to 10 carbon atoms, lower-dioxy-alkylene and ortho-dioxy-arylene of six to 10 carbon atoms, and $n$ is an integer of from 0 to 2.

2. The compounds of claim 1 in which R and R' are independently selected from the group consisting of lower alkoxy, lower-dioxy-alkylene and ortho-dioxy-arylene of six to 10 carbon atoms.

3. The compounds of claim 1 in which $n$ is O, A is para-phenylene and R' is lower alkoxy.

4. A compound of claim 1 having the structural formula:

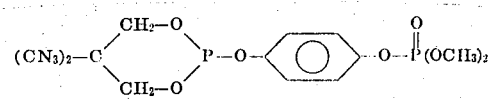

5. A compound of claim 1 having the structural formula:

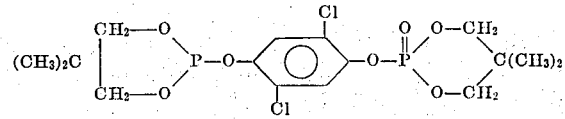

6. A compound of claim 1 having the structural formula:

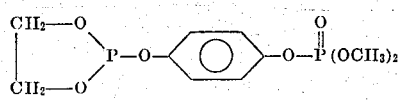

7. A compound of claim 1 having the structural formula:

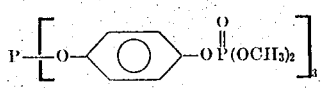

8. A compound of claim 1 having the structural formula:

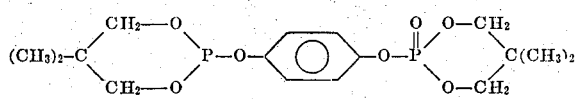

9. A process which comprises reacting a non-meso, para-quinone with a mixture of A. a compound of the formula:

$$R_nPX_{3-n}$$

in which R is a member independently selected from the group consisting of lower alkyl, aryl of six to 10 carbon atoms, lower alkoxy, lower-dioxy-alkylene, ortho-dioxy-arylene of 6 to 10 carbon atoms, aryloxy of six to 10 carbon atoms, lower dialkylamino, diarylamino of 12 to 20 carbon atoms, lower alkylmercapto and arylmercapto of six to 10 carbon atoms, $n$ is an integer from 0 to 2, and X is a member selected from the group consisting of -Cl and -Br, and B. a compound of the formula:

$$(R')_2POR''$$

in which R' is a member independently selected from the group consisting of lower alkoxy, aryloxy of six to 10 carbon atoms, lower-dioxy-alkylene and ortho-dioxy-arylene of six to 10 carbon atoms, and R'' is lower alkyl and lower-haloalkyl at a temperature from 0° to 95° C.

* * * * *